Patented Dec. 12, 1939

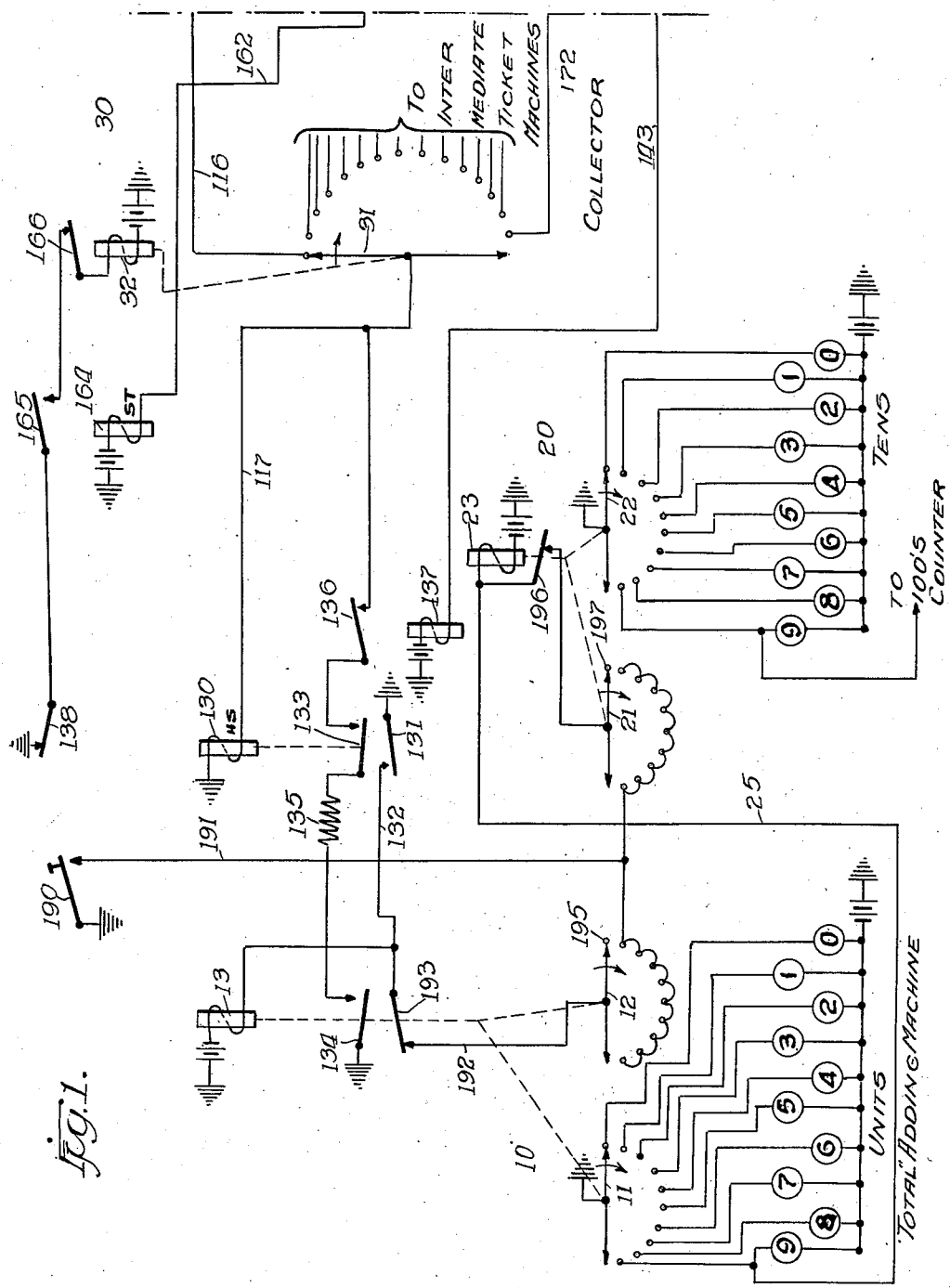

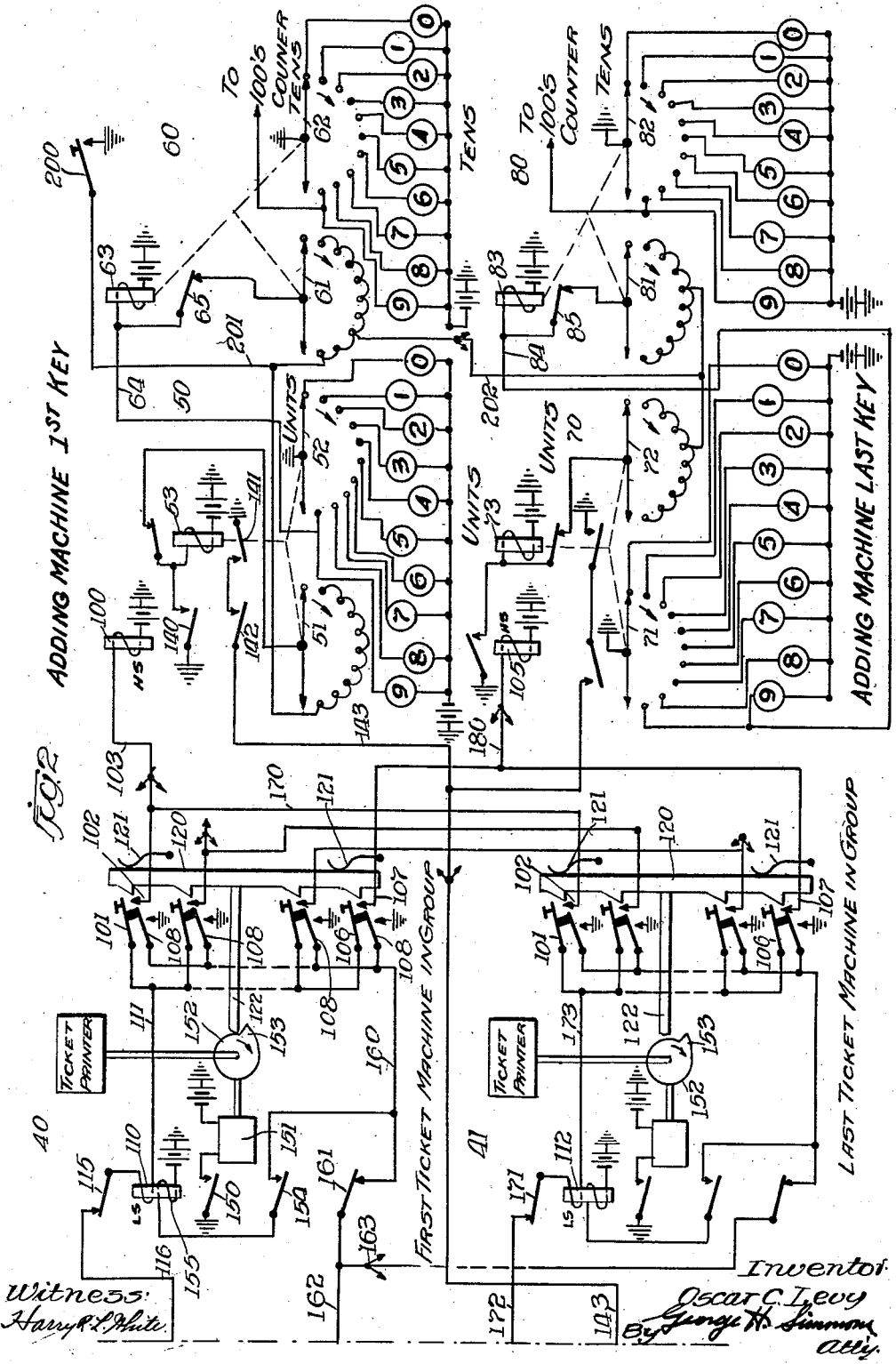

2,182,875

UNITED STATES PATENT OFFICE 2,182,875

TOTALIZING SYSTEM

Oscar C. Levy, Chicago, Ill., assignor to American Totalisator Company, Inc., Baltimore, Md., a corporation of Maryland Application September 12, 1936, Serial No. 100,464

8 Claims. (Cl. 235—92)

This invention relates to totalizing systems, and has for its principal object the provision of a new and improved system of this kind that is cheaper to manufacture and operate and is rapid and more reliable in its operation.

A totalizer may be defined as a device arranged to count and add separately operations of each kind performed by several devices of a group, and to simultaneously count and add the total number of operations of all kinds performed by the devices of the group and to display said sums on suitable indicators. Thus when used in connection with a group of ticket issuing machines which are capable of issuing a number of kinds of tickets, the totalizer through individual adding machine counts and displays the number of tickets of each kind issued by all of the ticket machines in the group and also through a total adding machine counts and displays the total number of tickets of all kinds issued by all of the machines of the group.

It is an object of the present invention to provide a totalizing system associated with the ticket issuing machines and arranged to be momentarily connected with the total adding machine one at a time and in definite sequence.

Another object of the invention lies in the provision of a collector associated with the total adding machine that is normally at rest and is started by a preparatory operation of a ticket machine to select that machine.

A further object lies in establishing a series circuit through the total adding machine, collector, ticket machine and individual adding machine over which circuit those mechanisms are controlled.

Still another object of the invention lies in the provision of a control for the collector operated over the series circuit to stop the collector and maintain the circuit closed until the adding machines have operated to register the issuance of a ticket.

Still another object lies in the provision of a means for acknowledging the registering of a preparatory operation of the ticket machine in the individual and total adding machines.

It is a further object to provide for controlling the ticket machine by the acknowledging means over the series circuit to initiate a ticket issuing operation of the machine.

A further object provides for releasing the total adding machine, individual adding machine and collector immediately upon the initiation of the ticket issuing operation of the ticket machine, to render these devices immediately available to other ticket machines.

Further objects of the invention not specifically enumerated here will be apparent from the detailed description and claims which follow, reference being had to the accompanying drawings in which a preferred embodiment is shown by way of example and in which:

Figure 1 is a schematic wiring diagram of the total adding machine and associated collector; and, Figure 2 is a schematic wiring diagram of the ticket machines and associated individual adding machines.

In the totalizing system shown in the drawings, a plurality of ticket machines are arranged in a group and each ticket machine is arranged to print and issue tickets of various denominations or kinds under control of an actuating key in the machine. There is provided a separate key for each denomination of ticket that the machine is adapted to issue, and responsive to an operation of a particular key, the machine is prepared to issue a ticket of the corresponding denomination. The ticket machines per se are not of the essence of the present invention as there are a number of machines of this type available upon the open market which may be used in connection with the present invention. Patent Numbers 1,886,626 and 1,886,627, issued to H. D. Black on November 8, 1932, show one form of machine suitable for use in this connection and reference is here made to these patents for the details of construction and operation of the machines.

Associated with the ticket machines are a plurality of adding machines that are associated with corresponding keys in each of the ticket machines of the group and individual thereto and are arranged to count and indicate the total number of tickets of a particular denomination issued by all of the ticket machines of the group. For convenience herein, these adding machines are referred to as individual adding machines.

In the totalizing system shown in the drawings, there is also provided an adding machine which is similar in structure to the previously mentioned counting devices and is adapted to count and indicate the total number of tickets of all denominations issued by all of the ticket machines of the group. For convenience herein, this adding machine is referred to as the total adding machine. A collector is associated with the total adding machine and adapted to selectively connect it with the ticket machines, one at a time and in definite sequence, thereby to prepare the system for operation, as will presently appear.

Referring now to the drawings in more detail, the total adding machine is shown as consisting of a stepping switch 10 having wipers 11 and 12 that are adapted to be driven over associated banks of contacts by an energization and deenergization of a motor-magnet 13. Preferably the motor-magnet is arranged to advance the wipers upon de-energization, switches of this type being well known to those skilled in the art. Switch 10 is shown arranged to register the units digit of the total number of tickets issued by the group and the banks of contacts over which the wipers pass are shown to contain ten contacts.

A second and similar switch 20 consists of wipers 21 and 22 and a motor-magnet 23 and is adapted to register the 10's digit of the total number of tickets issued by the ticket machine. The adding machine thus formed may be extended, as will presently appear, by the inclusion of other similar stepping switches so as to enable the machine to count 100's and 1,000's digits as well as units and 10's as shown.

While the total adding machine is shown as composed of stepping switches, this showing is made by way of example only, as it will be readily appreciated that relay counting chains or electromagnetically operated mechanical counters may be substituted within the teachings of the invention.

Figure 1 also shows a collector 30 which consists of a wiper 31 and motor magnet 32, which together form a stepping switch of the same type as stepping switches 10 and 20. The bank of contacts over which wiper 31 moves is shown to have a greater number of contacts than the banks of switches 10 and 20. Stepping switches of this type are available with 25 contacts in the bank, and through the use of such a switch the collector may selectively establish a connection with each one of 25 ticket machines in definite sequence.

A group of 25 ticket machines may be connected to the bank of a collector 30, with one machine to each contact in the bank, those machines being individual to those contacts and those contacts only. Since the wiper 31 engages the contacts sequentially one at a time, in case two or more ticket machines are operated simultaneously to initiate the function of issuing a ticket, no harm results since the ticket will not be issued by a machine until the collector wiper 31 is at rest on the bank contact leading to that ticket machine. Since no other collector has access to that group of ticket machines, each and every ticket issued is issued only after its issuance has been registered.

In Figure 2, in the upper left hand corner, I have shown a ticket machine 40 indicated as the "1st ticket machine in group" for the reason that it is connected to the 1st contact in the bank over which passes wiper 31 of the collector. Immediately below ticket machine 40 is a 2nd and similar ticket machine 41 designated as the "last ticket machine in group" for the reason that it is connected to the last contact of the bank of wiper 31. It will be understood that other ticket machines similar to 40 and 41 may be included in the group and connected to the collector bank intermediate to the 1st and last contacts.

In the upper right hand corner of Figure 2 there is shown an individual adding machine bearing the legend "adding machine 1st key", which is an individual adding machine similar to the total adding machine and comprising a stepping switch 50 having wipers 51 and 52 and a motor magnet 53 and adapted to register the unit's digit of the total number of tickets of a particular denomination issued by the ticket machines responsive to an operation of the 1st keys thereof, and a second stepping switch 60 comprising wipers 61 and 62 and a motor magnet 63 which is adapted to register the 10's digit of the number.

Immediately below the adding machine comprising stepping switches 50 and 60 is a similar adding machine comprising a stepping switch 70 having wipers 71 and 72 and a motor magnet 73 and a second stepping switch 80 having wipers 81 and 82 and a motor magnet 83, which adding machine is associated with the last key of the ticket machines and adapted to count the unit's and 10's digits respectively of the number of tickets of the denomination issued by the ticket machines responsive to an operation of the last key therein.

It will be understood that additional adding machines similar to the above will be provided and associated with the intermediate keys of the ticket machines, and that inasmuch as the ticket machines may have as many as 40 keys, there may be as many as 40 adding machines provided, there being one for each key. It will be further understood that the adding machines indicated in Figure 2 are shown by way of example only and that relay counting chains or electro-magnetically operated mechanical counters may be substituted within the teachings of the invention, and that the devices may be expanded to count more than the unit's and 10's digits shown.

Each of the adding machines is provided with a high sensitivity control relay, such as the relay 100 which is associated with the adding machine comprising switches 50 and 60. One terminal of this relay is connected to a source of electrical current, preferably a battery of about 50 volts potential. Each of the ticket machines contains a key 101 which is operable to prepare the machine to issue a ticket of the denomination that is to be registered by the 1st adding machine and the other terminal of relay 100 is multipled to a make contact 102 of the key 101 by a multiple conductor 103. Similarly, the high sensitivity relay 105 of the last key adding machine is multipled to a make contact 107 of the last key 106 in each of the ticket machines.

Ticket machine 40 is provided with a low sensitivity control relay 110 which has a low resistance starting winding, one terminal of which is multipled to the main springs of each of the keys 101—106 of the machine by a conductor 111. Ticket machine 41 and each of the other ticket machines, not shown, are similarly provided with a low sensitivity relay such as 112 which is multipled by conductor 113 to the main springs of the keys of that machine.

Throughout the drawings there are shown several batteries to which the several relays and magnets are connected, this arrangement being for convenience and simplification. In an actual installation of a system embodying the teachings of the invention, there will ordinarily be but one battery, preferably having its positive terminal grounded.

An operation of the system is initiated by depressing one of the keys of one of the ticket machines to prepare that machine to issue a ticket of the chosen denomination. Assume for the moment that key 101 of the ticket machine 40 is operated. As explained in the foregoing patents, depressing one key locks the other keys so that only one key of a ticket machine may be depressed at a time. A latch 120 engages the main spring of the key to lock it in depressed position. The operation of main spring 101 prepares a circuit for relays 110 and 100 which is extended from battery through the winding of relay 100, conductor 103, contact 102, and main spring 101 engaged thereby, conductor 111, through the upper winding of relay 110 through the main spring and break contact 115 of relay 110, conductor 116, to the 1st bank contact of the collector with which contact wiper 31 is assumed to be engaged at the moment. The circuit is extended through wiper 31 and conductor 117 through the winding of high sensitivity control relay 130 of the total adding machine to ground. Relays 100 and 130 are high sensitivity relays and have between them sufficient resistance to limit the current flowing in the above traced circuit to such a low value that the low sensitivity relay 110 of the ticket machine is not operated, but the high sensitivity relays are operated. Relay 130, in addition to being a high sensitivity relay, that is one having a relatively high ampere-turn strength, is so wound as to be high speed in its operation, and when energized in series with relays 100 and 110, will operate before relay 100.

The energization of relay 130 closes a circuit from ground through main spring 131 and the make contact engaged thereby, conductor 132, through the winding of magnet 13 to battery, energizing that magnet preparatory to advancing the wipers 10 and 11 one step to register the operation of key 101. Energization of relay 130 also closes main spring 133 against its make contact, and energization of motor magnet 13 extends a circuit from ground through main spring 134, resistor 135, main spring 133 and its make contact, to the main spring 136 of the acknowledging relay 137, however. since this relay is not yet energized, this circuit extends no further. The operation of relay 130 also opens main spring 138 from its break contact to open a point in the circuit of the motor magnet 32 of the collector 30 to prevent energization of that magnet until relay 130 is restored.

The operation of relay 100 in the 1st key adding machine closes a circuit from ground through main spring 140, through the winding of magnet 53 of stepping device 50 to battery, energizing that magnet preparatory to advancing the wipers of the switch. The energization of magnet 53 closes a circuit from ground through main spring 141 and its make contact, through main spring 142 of relay 100 and its make contact, conductor 143, through the winding of relay 137 (Figure 1) to battery, energizing the relay 137. The circuit that was extended from ground through resistor 135 to the main spring 136 of relay 137 is now extended through the make contact of that main spring to conductor 117 through wiper 31 and over the previously traced series circuit through relays 110 and 100. The resistance of resistor 135 is less than the resistance of high sensitivity relay 130 with which it is now connected in parallel, and the current flow in the series circuit is increased sufficiently to cause low sensitivity relay 110 to be energized. Although resistor 135 shunts relay 130, the resistance of the shunt is sufficiently high to permit enough current to pass through the relay winding to maintain the relay in its operated position.

Relay 110, upon energizing, closes a locking circuit for itself which may be traced from ground through spring 108 and its make contact, conductor 160, spring 154, and its make contact, through the lower winding 155 of relay 110 to battery. Relay 110 also closes a circuit from ground through springs 150, through the motor 151 to battery, thereby causing the motor to operate the ticket machine to print and issue a ticket in the manner explained in the above referred to patents. The operation of motor 151 rotates to cam 152 in the direction indicated by the arrow to move the hill 153 of the cam into engagement with the push rod 122 and to move that push rod and the latching lever 120 to the right, Figure 2, against the tension of springs 121. This releases the key 101 to permit it to restore and thereby restore the ticket machine to normal and in readiness for a subsequent operation.

The energization of relay 110 opens spring 115 from its break contact, thereby to open the series circuit through relays 100, 110 and 130 before the operation of the ticket machine has been completed and the circuit opened by the restoration of key 101. Relay 100 falls back immediately and opens springs 140, thereby to break the circuit of magnet 53 to permit that magnet to de-energize and advance wipers 51 and 52 one step. De-energization of relay 100 opens springs 142 to break the previously traced circuit of relay 137 to permit that relay to restore to normal. De-energization of relay 130 opens the circuit of magnet 13 at springs 131 to permit that magnet to restore to normal and advance wipers 11 and 12 one step, and at springs 138, closes a point in the circuit of magnet 32 to prepare that magnet for operation, as will presently appear.

As shown in the drawings, the contacts engaged by wiper 11 of the stepping switch 10 are connected to indicating devices shown as circles containing the legends "0–9" and a circuit is closed from ground through the wiper to battery through the indicating device. The indicating device may be lamps provided with suitable caps bearing the legends, or may be any other preferred type of indicating device, such as for example, an indicator of the type shown in the Patent 1,967,887 issued to Johnston on July 24, 1934. Normally the units and 10's indicating devices both indicate zero and when the stepping switch 10 is moved one step, as above explained, the zero indication will be erased by the movement of wiper 11 from its normal to its 1st position contact and indication of 1 will be substituted. Successive operations of the stepping switches move the wiper 11 to successively operate the indicators until indicator 9 is illuminated, at which time a parallel circuit is closed from ground through wiper 11, conductor 25, through the winding of motor magnet 23 of stepping switch 20 to battery, to energize that magnet preparatory to advancing wipers 21 and 22 one step. When the circuit of magnet 13 of stepping switch 10 is again broken, wiper 11 moves off of number 9 contact and back into engagement with the number 0 contact, thereby breaking the circuit of magnet 23 which de-energizes and advances wiper 22 from its 0 contact into its number 1 contact and the total adding machine thus indicates 10.

In Figure 1, I have shown a multipled connection from number 9 lamp in the 10's indicator leading to a legend "to 100's counter", which may be provided to enable the total adding machine to register a larger number of tickets. The 100's counter is a duplicate of the 10's counter and connected in the same way, and has been omitted from the drawings to avoid an unnecessary complication thereof.

In the adding machine associated with the 1st key, the 10th contact of the bank engaged by wiper 52 is connected by conductor 64 to the winding of motor magnet 63 of the 10's counter so that that magnet will be operated as wiper 52 moves from its number 9 to its 0 position and 10's legend indications are brought up in the same manner as previously explained.

In the foregoing cycle of operation, it was assumed that the wiper 31 was standing in engagement with the contact leading to the ticket machine that was operated. The collector has no normal position and when at rest, remains in the position last used so such an operation may frequently occur. However, in a majority of instances, the wiper 31 will not be associated with the ticket machine in which is operated a key such as key 101 and consequently the collector must be stepped to bring it into engagement with that ticket machine.

To this end, each of the keys 100—106 in each of the ticket machines is provided with a second set of contacts, insulated from the first, and comprising a main spring 108 and associated make contact. All of the main springs 108 of one ticket machine are multipled together to a conductor 160, which extends through normally closed spring contacts 161 that are controlled by the control relay 110 of the machine. A start wire 162 is multipled into each of the ticket machines as indicated at 163, Figure 2, so that closing of any one of the keys in any one of the ticket machines will complete a circuit from ground through the springs 108, conductor 160, contacts 161, conductor 162, through the winding of start relay 164 to battery, energizing this relay. A circuit may be then traced from ground through the normally closed contacts 138 controlled by relay 130, through spring 165 and its make contact, through normally closed contact 166 controlled by motor magnet 32, through the winding of the motor magnet 32 to battery. Magnet 32 is energized over this circuit and prepares to advance wiper 31 of the collector one step, and opens its own circuit by opening springs 166, whereupon the magnet de-energizes to advance the wipers. De-energization of magnet 32 again closes the circuit just traced and the operation is repeated, the magnet operating buzzer like to rapidly advance wiper 31. When the wiper comes into engagement with the contact leading to the relay of the ticket machine in which the key was operated, such as for example, the contact to which conductor 116 is connected, the series circuit through relay 130, relay 110, and relay 100 is completed as before. Relay 130, as previously explained, is a high speed relay and will operate more rapidly than the motor magnet 32 and consequently will open the circuit of the magnet, by opening springs 138, before the magnet has had time to again energize. As a result of this operation the collector is stopped when it becomes associated with a ticket machine in which there is a depressed key and the cycle of operation hereinbefore explained is effected.

The operation of the last ticket machine of the group is identical with the hereinbefore described operation of the 1st ticket machine and need not be repeated in detail. Should the last machine be operated by depressing key 101 therein to prepare that machine to issue a ticket of the 1st denomination, series circuit from the relay 100 is prepared through conductor 103, conductor 170 through the make contact and main spring of the key 101 in the last ticket machine, conductor 173, the upper winding of relay 112, normally closed contact 171 controlled by that relay, conductor 172, which terminates upon the last contact in the bank of the collector, the circuit being extended through wiper 31 and conductor 117 to ground through the relay 130 as before.

An operation of key 106 in the 1st ticket machine to prepare that machine to issue a ticket of the last denomination prepares a circuit for the control relay 105 of the last individual adding machine which extends from battery through the winding of that relay, conductor 180, through the make contact 107 and main spring 106 associated therewith, conductor 111, thence over the previously traced circuit through relays 110 and 130. An operation of the key 106 in the last ticket machine extends a similar circuit from conductor 180 through make contact 107 and main spring 106 of the last ticket machine, conductor 173, the upper winding of relay 112, and thence through the previously traced circuit to the winding of relay 130.

From the foregoing it will be apparent that an operation of a key in any one of the ticket machines, to prepare that ticket machine to issue a ticket of a particular denomination, prepares a circuit extending to the individual adding machine in which the tickets of that denomination are registered. The depressing of the key also closes a starting circuit by which the normally at rest collector is started to search out and find the ticket machine containing the depressed key. When such selection is made, a series circuit is extended through a control relay in a total adding machine, a control relay in the ticket machine, and a control relay in the individual adding machine, over which circuit the respective devices are actuated. The collector is stopped to maintain the connection so long as the same is needed. The operation of the control relay and motor magnet of the counting mechanism in the individual adding machine prepares a circuit for operating the ticket machine. The operation of the control relay and magnet of the counting mechanism in the total adding machine completes the circuit for operating the control relay in the ticket machine. Thus it will be seen that a ticket cannot be issued until its issuance is registered in the individual adding machine for the selected denomination of ticket and in the total adding machine.

Immediately upon operation of the control relay of the ticket machine, the circuit through the control relays is broken to render the total adding machine, collector and individual adding machine immediately available to other ticket machines. The energization of this control relay also causes an operation of the ticket machine which is released only after it has been completely operated and the ticket issued therefrom.

Thus it will be seen that I have provided a totalizing system that possesses many advantages. It is simple in its construction and reliable in its operation, each step of the operation being dependent upon the successful completion of a previous step.

In order to reset the equipment back into the normal position in which it is shown in the drawings, there is provided a re-set key 190, Figure 1, which, when closed, completes a circuit from ground through conductor 191, through the multipled contacts of the bank of switch 10 engaged by wiper 12, conductor 192, normally closed contact 193, controlled by motor magnet 13, through the winding of motor magnet 13 to battery. Magnet 13 is energized over this circuit and opens its own circuit by opening contacts 193, whereupon the magnet de-energizes and advances the switch wipers. Upon de-energization, the magnet 13 closes its own circuit so long as the wiper 12 engages the multipled contacts of its bank. The normal position contact 195 is not included in the multiple and the switch comes to rest when wiper 12 engages that contact.

The operation of re-set key 190 also extends a circuit from ground through the multipled contacts of the switch 20 over which wiper 21 passes, to complete a circuit through normally closed contacts 196 through the winding of magnet 23, to battery, to operate that magnet buzzer fashion to advance wipers 21 and 22 until wiper 21 engages contact 197 which is not included in the multiple.

A similar re-set key 200 is associated with the group of individual adding machines associated with the ticket machines and, when closed, extends a circuit over conductor 201 to the multipled bank contacts of switch 60 engaged by wiper 61, also to the multipled bank contacts of switch 50 engaged by wiper 51, and also over conductor 202 to the multipled contacts of the switch 70 engaged by wiper 72 and the multipled contacts of switch 80 engaged by wiper 81, and also to similar banks in each of the stepping switches of the group. The motor magnets of the respective stepping switches are operated in a buzzer like manner over this circuit to bring their respective wipers into normal position.

While I have chosen to show my invention by illustrating and describing a preferred embodiment of it used in connection with a ticket issuing machine, I have done so by way of example only as the system may be used in other connections within the teachings of the invention. Further, the specific instrumentalities of the embodiment shown by way of example may be modified by one skilled in the art within the teachings of the invention.

Having thus complied with the statutes and shown and described a preferred embodiment of my invention what I consider new and desire to have protected by Letters Patent is pointed out in the appended claims.

What is claimed is:

1. The combination with a plurality of electrical devices operable together in combinations of three, of control means therefor comprising a high sensitivity relay in each of two devices of the combination, a low sensitivity relay in the third device of the combination, means for establishing a series circuit through the three relays, means for energizing said circuit to operate the high sensitivity relays thereover to control the associated devices, means for shunting one of said high sensitivity relays to increase the current flow in said circuit and thereby operate the low sensitivity relay, and means including contacts opened by the low sensitivity relay for breaking said series circuit.

2. The combination of a plurality of electrically controlled machines, a plurality of electrically controlled individual adding machines, a relay in each of said machines and individual adding machines means in each machine operable to temporarily directly connect one of the individual adding machines therewith, a total adding machine, a control relay therein, a collector, a start relay therein, means operated by said direct connecting means for energizing said start relay, means responsive to the energization of said start relay for operating said collector to temporarily connect together the total adding machine to the operated machine and individual adding machine, means for operating the control relays in said connected devices, and means responsive to the operation of said relays for breaking the connection between said devices.

3. The combination with a plurality of electrical devices grouped in three groups and operable together in combinations of three, one device from each group, of control means therefor comprising a high sensitivity relay in each of two devices of the combination, a low sensitivity relay in the third device of the combination, operation initiating means in the devices of one group operable to connect together a device in each of two of the groups, a collector associated with the third group, means responsive to an operation of said operation initiating means for operating said collector to complete said combination by establishing a series circuit through the three relays thereof, means for energizing said circuit to operate the high sensitivity relays thereover to control the associated devices, means in one of said devices for increasing the energization of said circuit and thereby operate the low sensitivity relay, and means operated by the low sensitivity relay for breaking said circuit.

4. In a totalizing system, a group of ticket machines, a plurality of keys in each machine, a plurality of individual adding machines corresponding in number to the number of said keys, a control relay in each adding machine, circuit means directly and permanently connecting each control relay to the corresponding key in each of said ticket machines, a relay in each ticket machine, circuit means connecting one terminal of each relay to all the keys of that machine, a total adding machine, a relay therein, a collector, circuit means including said collector for establishing a circuit from said total adding machine to the other terminals of said ticket machine relays one at a time in definite sequence and arranged to establish a series circuit through said relays, means for energizing said relays over said circuit, means controlled by said total adding machine relay for maintaining said circuit closed, and means controlled by the ticket machine relay for opening said circuit.

5. In a totalizing system, a plurality of ticket issuing machines, a plurality of actuating keys in each machine, each key having a main spring and a make contact closed together when the key is depressed, a relay in each machine, circuit means connecting one terminal of said relay to each of said main springs, a plurality of individual adding machines corresponding in number to the number of said keys, a relay in each adding machine, circuit means connecting each one of said relays to a said make contact of the corresponding key in each one of said ticket machines, a total adding machine, a relay therein, means for connecting one terminal of said latter relay to the free terminals of said relays in said ticket machines one at a time and in sequence, a source of current one terminal of which is connected to the other terminal of said total adding machine relay and the opposite terminal of which is connected to the free terminals of said individual adding machine relays, said connecting means closing a circuit from said source of current through said total adding machine relay, the relay of a ticket machine, a closed key in said machine and the relay in the corresponding individual adding machine, said total adding machine relay and said individual adding machine relay operating over said circuit to register the operation of the ticket machine key, and means actuated by the operation of said relays for operating said ticket machine relay to initiate an operation of the machine to issue a ticket.

6. In a totalizing system, a plurality of individual adding machines, a control relay in each machine, a magnet in each adding machine, circuit means for said magnet closed by said control relay in operated position for operating the magnet, a plurality of ticket issuing machines, a control relay in each machine, means in each ticket machine for extending a circuit from the ticket machine relay to the control relay of one of said individual adding machines, a total adding machine, a control relay therein, a magnet in said total adding machine, circuit means for said magnet closed by said control relay in operated position for operating the magnet, a normally at rest collector, a start relay in said collector, means in said ticket machine controlled by said circuit extending means for closing a circuit for said start relay, means controlled by said start relay for operating said collector to select said ticket machine and to extend said circuit through said total adding machine control relay to energize that relay and the individual adding machine relay, means controlled by said total adding machine relay for stopping said collector to maintain said circuit closed, means controlled jointly by said individual adding machine relay and magnet and said total adding machine relay and magnet for operating said ticket machine relay over said circuit, and means controlled by said ticket machine relay for opening said circuit.

7. In a totalizing system, a plurality of individual adding machines, a control relay and a magnet in each of said machines, circuit means for said magnet closed by said control relay in operated position for operating the magnet, a plurality of ticket issuing machines, a control relay in each machine, means in each ticket machine for extending a circuit from the ticket machine relay to the control relay of one of said individual adding machines, a total adding machine, a control relay and a magnet in said total adding machine, circuit means for said magnet closed by said control relay in operated position for operating the magnet, a normally at rest collector, a start relay in said collector, means in said ticket machine controlled by said circuit extending means for closing a circuit for said start relay, means controlled by said start relay for operating said collector to select said ticket machine and to extend said circuit through said total adding machine control relay to energize that relay and the individual adding machine relay, means controlled by said total adding machine relay for stopping said collector to maintain said circuit closed, an acknowledging relay, a circuit for said relay closed jointly by said individual adding machine relay and magnet in operated position, means controlled by said acknowledging relay for shunting a grounded resistance around said total adding machine relay to operate said ticket machine relay over said circuit, and means controlled by said ticket machine relay for opening said circuit.

8. In a totalizer system, a total adding machine, a ticket machine, an individual adding machine, a relay in each of said machines, means for establishing a circuit through said relays in series, means for operating the total adding machine relay and the individual adding machine relay over said circuit, magnet means in said total adding machine and individual adding machines, an acknowledging relay, circuit means for said acknowledging relay controlled jointly by the magnet means and relay of said individual adding machine for energizing said acknowledging relay, means controlled jointly by said total adding machine magnet means and relay and said acknowledging relay for energizing the ticket machine relay over said series circuit, means actuated by said ticket machine relay for opening said series circuit, and means controlled by said ticket machine relay for operating said ticket machine.

OSCAR C. LEVY.